June 22, 1937.  J. L. CABRAL  2,084,627
TELLTALE FOR AUTOMOBILE HEADLIGHTS
Filed June 10, 1936

Inventor
Jesse L. Cabral

By Clarence A. O'Brien
Hyman Berman
Attorneys

Patented June 22, 1937

2,084,627

UNITED STATES PATENT OFFICE 2,084,627

TELLTALE FOR AUTOMOBILE HEADLIGHTS

Jesse Lawrence Cabral, Eastondale, Mass.

Application June 10, 1936, Serial No. 84,549

2 Claims. (Cl. 88—81)

This invention relates to telltale devices for use on automobiles and through the medium of which the driver of an automobile may, without leaving his seat, ascertain whether his headlights are lit.

An object of the present invention is to provide a device of this character which may be mounted as a single unit, on an automobile in such position relative to both headlights of the automobile as to be used for indicating the condition of either or both headlights.

The invention together with its objects and advantages will be best understood from a study of the following description taken in connection with the accompanying drawing wherein.

Figure 1:
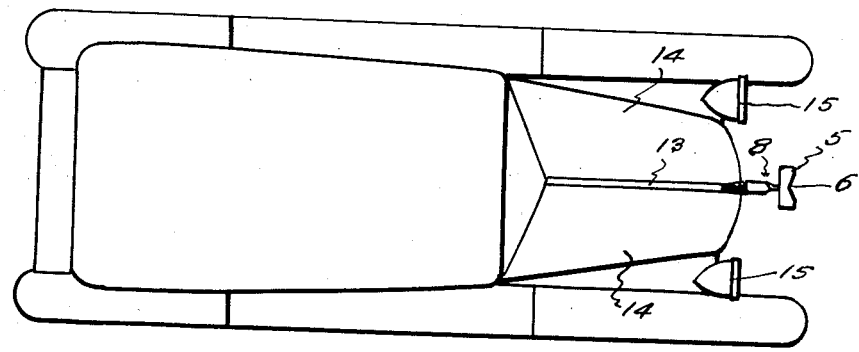
Figure 1 is a top plan view illustrating the application of the invention.
Figure 2:
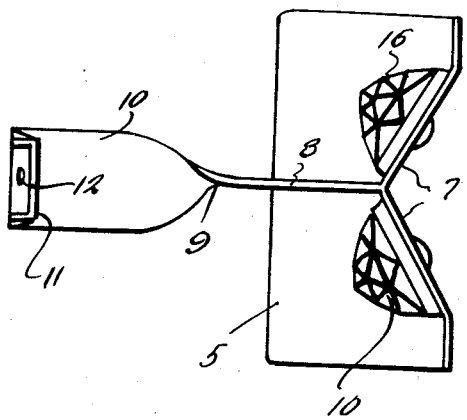
Figure 2 is a bottom plan view of the telltale device.
Figure 3:
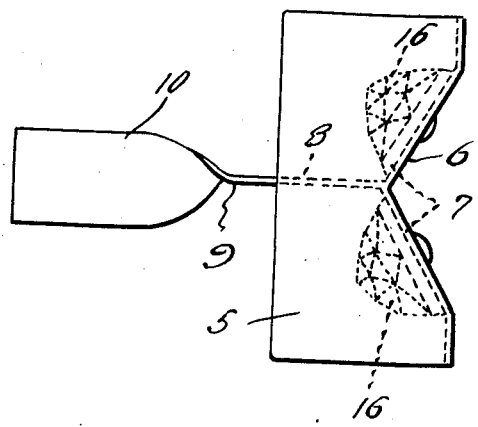
Figure 3 is a top plan view of the telltale device.
Figure 4:
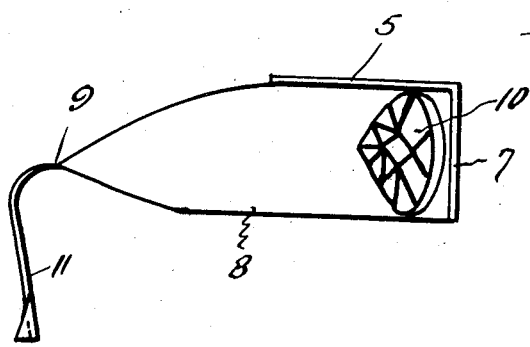
Figure 4 is a side elevational view thereof.

Referring to the drawing by reference numerals it will be seen that the telltale device comprises a main body or top plate 5 provided at one longitudinal edge thereof with a substantially V-shaped notch 6. At the notch edge thereof the plate 5 is provided with a depending flange 7 that extends from one end to the other end of the plate 5. Integral with the underside of the plate 5 and the flange 7 at the apex of the notch 6 is one end of an attaching bracket 8 which bracket intermediate its ends is provided with a twist 9 to provide an end 10 terminating in a down turned extension 11 apertured as at 12 for receiving a fastening element through the medium of which the end portion 11 of the bracket is secured to the front side of the radiator of an automobile in substantial alignment with the hinge 13 between the hood sections 14 of the automobile as clearly suggested in Figure 1.

It will thus be seen that the reflector is so mounted on the automobile as to be positioned intermediate the headlights 15 of the automobile and to be extended forwardly with respect to the headlights.

On the angularly related sections of the flange 7 and at opposite sides of the bracket 8 there are secured reflectors 16 there being one reflector for each headlight as is apparent.

Thus it will be seen that the colored reflector members or buttons 16 are so positioned that they may be illuminated by the headlights and these buttons are so mounted and positioned through the medium of the bracket 8 as to be clearly visible from a point above and rearwardly of the headlights, or in other words to the operator of the vehicle. Thus it will be seen that when the headlights are lit the rays therefrom will illuminate the colored reflectors or buttons 16. Thus the driver may at any time ascertain without leaving the seat whether one or both of the headlights are lit.

Having thus described the invention what is claimed is:—

1. An attachment for automobiles comprising a bracket member provided at one end with means adapted to be attached to a selected part of an automobile, a plate mounted on the free end of the bracket and extending laterally of the bracket on both sides thereof, said plate having one longitudinal edge provided with a substantially V-shaped notch and a V-shaped flange depending from the sides of the notch, and reflector buttons mounted on the flange beneath said plate and disposed at opposite sides of the bracket.

2. A telltale device for automobile headlights comprising a bracket having an end provided with means adapted to be attached to an automobile in a manner to support the bracket in a forwardly extending position at the front of the automobile, a transversely disposed plate on the free end of the bracket and extending laterally from opposite sides of said bracket, said plate being provided at one transverse edge thereof with a depending flange extending laterally from opposite sides of the bracket, and reflector buttons disposed beneath said plate and mounted on the flange at opposite sides of the bracket.

JESSE LAWRENCE CABRAL.